United States Patent [19]

Bernat

[11] Patent Number: 4,887,642
[45] Date of Patent: Dec. 19, 1989

[54] SINGLE HANDLE MIXING TAP OR VALVE

[75] Inventor: Georg J. Bernat, Victoria, Australia

[73] Assignee: Dorf Industries Pty. Ltd., Victoria, Australia

[21] Appl. No.: 262,807

[22] Filed: Oct. 26, 1988

[30] Foreign Application Priority Data

Oct. 27, 1987 [AU] Australia ............................... PI5086

[51] Int. Cl.⁴ ............................................. F16K 11/06
[52] U.S. Cl. ............................. 137/625.41; 137/625.17
[58] Field of Search ...................... 137/625.41, 625.17, 137/625.4

[56] References Cited

U.S. PATENT DOCUMENTS

| 4,610,272 | 9/1986 | Gottwald et al. | 137/625.17 |
| 4,651,774 | 3/1987 | Oberdörfer | 137/625.17 |
| 4,733,688 | 3/1988 | Lorch | 137/625.17 X |

FOREIGN PATENT DOCUMENTS

| 48104 | 4/1981 | Fed. Rep. of Germany | 137/625.41 |
| 48106 | 6/1981 | Fed. Rep. of Germany | 137/625.41 |

Primary Examiner—Arnold Rosenthal
Attorney, Agent, or Firm—Birch, Stewart, Kolasch & Birch

[57] ABSTRACT

A single handle mixing tap includes a tap body within which is a valve mechanism comprising a pair of discs, one of which is rotatable against the other and also movable transversely across the other, whereby fluids to be mixed together from two separate inlets communicating with aligned apertures through the discs can have the ratio of their volumes, as well as their combined volume, varied. The movable disc is coupled by a ball joint arrangement to a rotatable and tiltable handle, whereby the axis of rotation of the disc and the handle through the ball joint during rotation of the disc, and the axis of tilting of the handle relative to the disc at the ball joint during transverse movement of the disc, is such that substantially all forces applied by the handle to the ball joint are radially of said joint rather than along the longitudinal axis of the tap thus relieving friction between the faces of the discs and lowering the operating forces to thereby reduce possible damage to the discs. The tap body is closed by a cap having an opening through which the handle extends. The size and shaping of the handle, the size of the opening and the axis of tilting of the handle are such that during all tilted positions of the handle, it substantially closes the opening. Controls are also provided to limit the degree of rotation of the movable disc, to limit the tilting of the handle, and to provided adjustable control for the upper and lower temperature limits of the fluid mixture issuing from the tap.

15 Claims, 5 Drawing Sheets

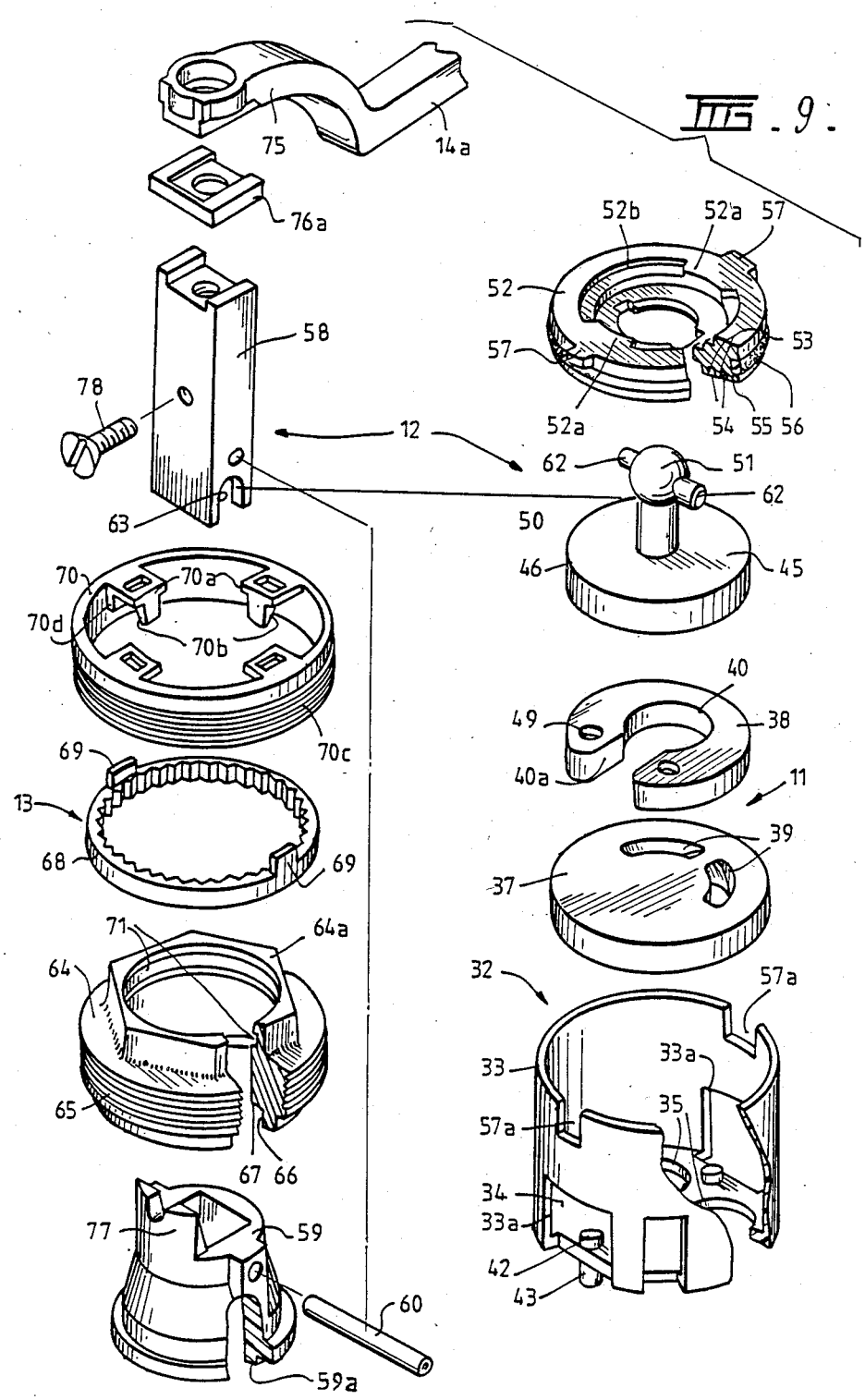

SINGLE HANDLE MIXING TAP OR VALVE

This invention relates to a single handle mixing tap or valve (hereinafter referred to as a tap) of the type in which hot and cold water entering through separate inlets are mixed together in a ratio variable according to the rotatable position of the handle, while the volume of the mixture is varied according to a vertically tilted position of the handle. More particularly, the invention is directed to a tap in which the valve mechanism comprises a pair of discs, one of which is movable with respect to the other which is fixed, whereby relative rotation of the movable disc against the fixed disc controls the ratio of the mixture of hot and cold water through the valve mechanism while transverse movement of the movable disc across the fixed disc varies the volume of the mixture passing through the valve mechanism to the tap outlet.

SUMMARY OF THE INVENTION

It is an object of one aspect of the invention to provide a single handle mixing tap enabling a more precise and direct transmission of both the rotatable and tilting movements of the handle to the valve mechanism within the tap.

In accordance with the first aspect of the invention, a single handle mixing tap is provided, including a tap body within which is a valve mechanism comprising a pair of discs one of which is rotatable against the other and also movable transversely across the other, whereby fluids to be mixed together from two separate inlets communicating with aligned apertures through the discs can have the ratio of their volumes, as well as their combined volume, varied the movable disc is coupled by a ball joint arrangement to a rotatable and tiltable handle, whereby the axis of rotation of said movable disc and said handle through said ball joint during rotation of said movable disc, and the axis of tilting of said handle relative to said movable disc at said ball joint during transverse movement of said movable disc, is such that substantially all forces applied by the handle to said ball joint are radially of said joint rather than along the longitudinal axis of the tap.

Such a relationship between the rotatable and tilting axes at the ball joint in reducing or eliminating axial forces through the tap ensures that axial forces on the disc assembly are minimized thus relieving friction between the faces of the discs and lowering the operating forces while also reducing possible damage to the discs.

It is an object of a second aspect of the invention to minimize the amount of access by water and other contaminants to the interior of the tap and other cavities which may be difficult to clean and thus may represent a health hazard.

In accordance with the second aspect of the invention, a single handle mixing tap is provided, including a tap body within which is a valve mechanism comprising a pair of discs one of which is rotatably against the other and also movable transversely across the other, whereby fluids to be mixed together from two separate inlets communicating with aligned apertures through the discs can have the ratio of their volumes, as well as their combined volume, varied. The tap body is closed by a cap having an opening through which a handle extends, which handle is tiltable to move said movable disc, and whereby the size and shaping of said handle and the size of said opening, together with the axis of tilting of said handle relative to said cap, are such that a portion of said handle extending through said opening during all tilted positions of said handle substantially closes said opening.

It is an object of a third aspect of the invention, to provide means whereby, when hot and cold fluids are to be mixed, the upper or lower limits of the temperature of the resulting mixture can be adjustably controlled.

In accordance with the third aspect of the invention, a single handle mixing tap is provided, including a tap body within which is a valve mechanism comprising a pair of discs one of which is movable against the other to vary the ratio of volumes of hot and cold fluids to be mixed and passing through aligned apertures through the discs communicating with two separate inlets for the fluids to be mixed, and a handle movable to move said movable disc. At least one pair of first abutment means are movable with said handle, and at least one pair of second abutment means are fixed with respect to said tap body, whereby movement of said handle in one direction with respect to said tap body brings one of said first abutment means into contact with one of said second abutment means to limit the movement of said movable disc in that direction to thereby control the volume of hot fluid to be mixed, and movement of said handle in the opposite direction relative to said tap body brings the other of said second abutment means into contact with the other of said second abutment means to limit the movement of said movable disc in that direction to thereby control the volume of cold fluid to be mixed, and wherein the position of one, or the other, or both, of said first and second abutment means is adjustable to vary the respective volumes of hot and cold fluids to be mixed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

One preferred embodiment, incorporating all three aspects of the invention, will now be described with reference to the accompanying drawings which are given by way of illustration only, and thus are not limitative of the present invention, and in which:

FIG. 3 is an enlarged view of part of the cross-sectional view of FIG. 2 with the operating handle and associated valve mechanism in an alternative position;

FIG. 9 is an exploded perspective view showing the respective components of the valve mechanism and the operating mechanism therefor, the walls of some of which components have been cut-away to show the interiors thereof to assist in description.

DETAILED DESCRIPTION OF THE PREFERRED EMBODIMENTS

Figure 1:
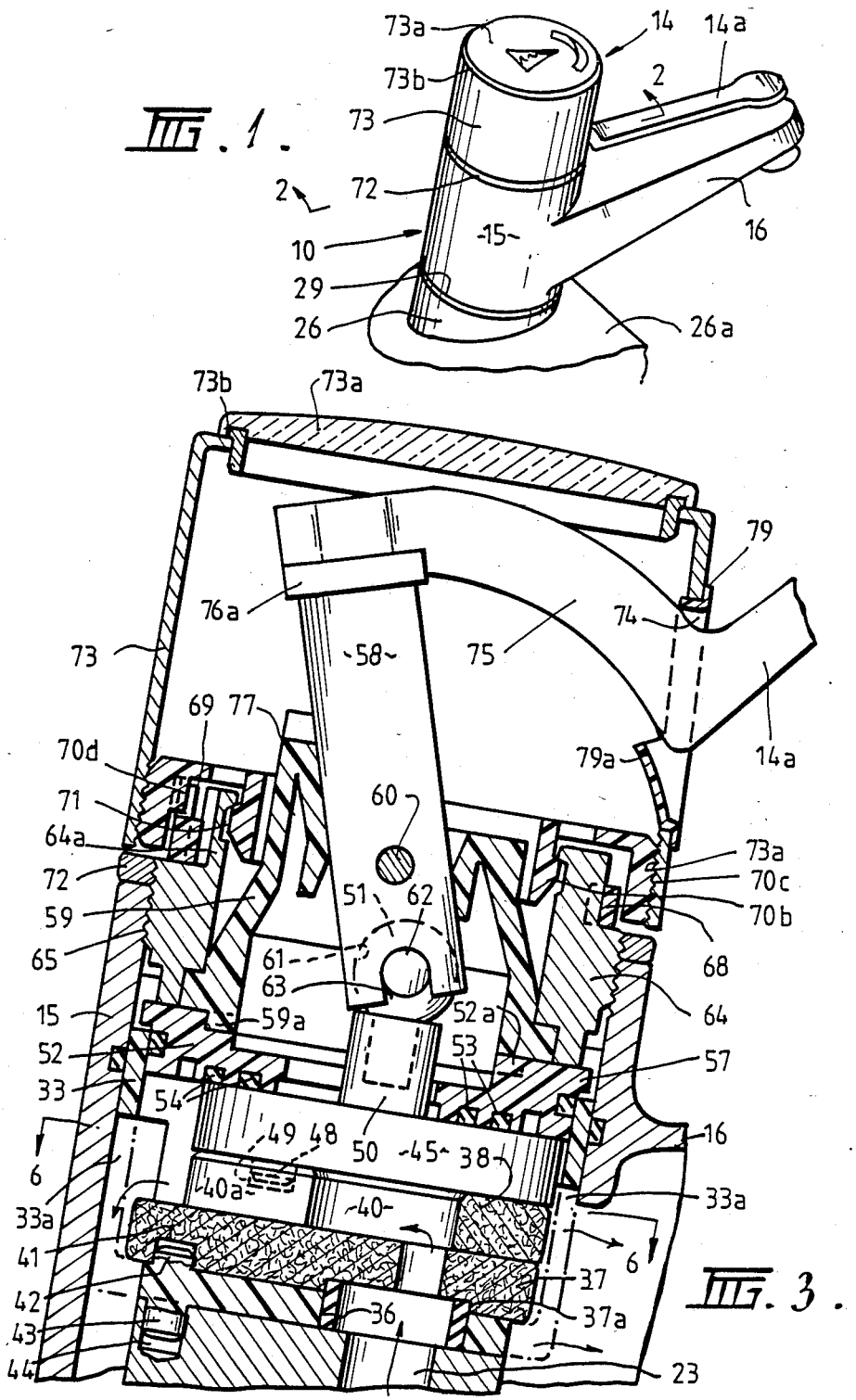
FIG. 1 is a rear perspective view of the single handle mixing tap of this embodiment of the present invention.

Referring to FIG. 1 of the drawings, the single handle mixing tap of this embodiment of the invention comprises;

a tap body generally indicated as 10 in communication with an outlet 16, and a cap and handle assembly 14 for controlling a valve mechanism within the tap body.

Figure 2:
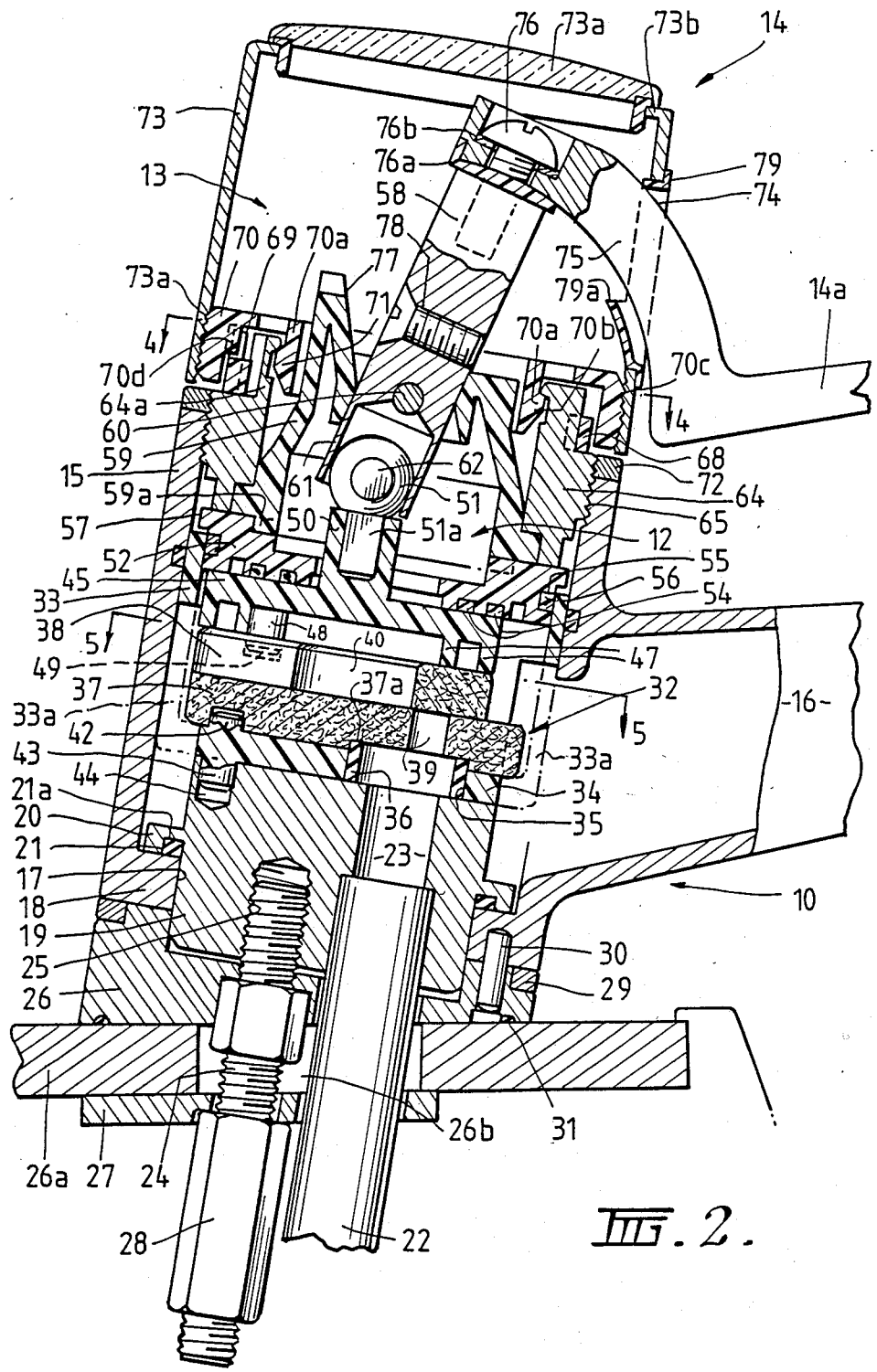
FIG. 2 is a longitudinal cross-sectional view taken along line 2—2 of FIG. 1.
Figure 4:
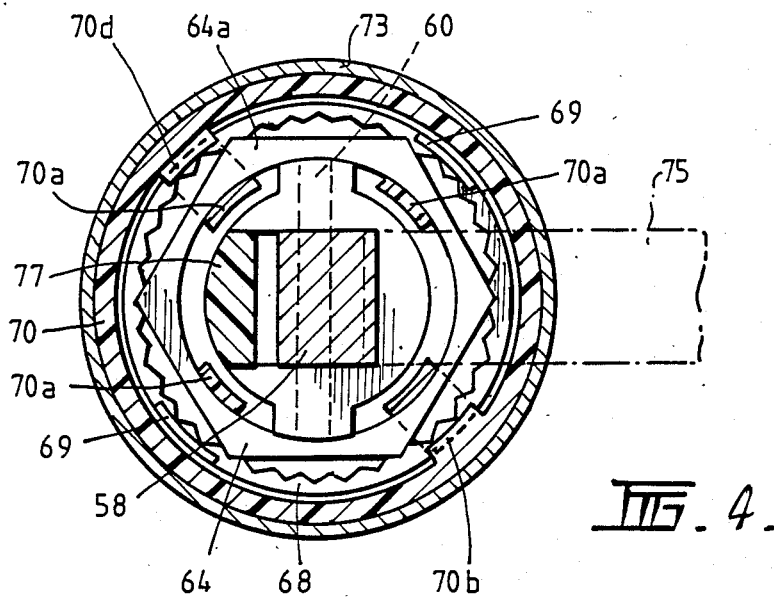
FIG. 4 is a transverse cross-sectional view taken along line 4—4 of FIG. 2.

With reference to FIGS. 2 and 3 of the drawings the tap body contains a valve mechanism generally indicated as 11;

a valve operating mechanism generally indicated as 12; and a limiting mechanism 13 for limiting the rotation, and also the tilting movements, of the valve operating mechanism.

With further reference to FIGS. 2 and 3, the tap body 10 comprises a generally cylindrical housing 15, from which the outlet 16 is radially outwardly directed and communicates with the interior of the housing 15. The lower end of the housing has an opening 17 defined by a radially inwardly directed flange 18, and a cylindrical tap mounting body 19 is mounted through the opening and has a circumferentially extending flange 20 abutting the inner side of the flange 18 of the tap body and being undercut at 21 to provide a groove for the receipt of a sealing "O" ring 21a at the abutting faces of the flanges 20 and 18. A pair of inlet pipes 22 (only one of which is visible in FIG. 2, the other being behind and in alignment with that illustrated), are provided, one for hot inlet water and the other for cold inlet water and communicating with passages 23 through the mounting body 19. A threaded connecting stud 24 is received within a corresponding threaded blind hole 25 within the mounting body 19. The inlet passage 22 and the connecting stud 24 all extend through an angled support plate 26, the angle of which determines the inclination of the mixing tap relative to a support surface to which the tap is clamped by a clamping plate 27 movable to a clamping position by an elongate adjustment nut 28 transversible along the connecting stud 24. A dress ring 29 for decorative purposes in interposed the support plate 26 and the tap body (see also FIG. 1), while the plate 26 and tap body 10 are located relative to each other by a locating pin 30. A sealing "O" ring 31 received in an annular groove in the lower face of the plate 26 serves to seal the assembly against the support surface formed by a bench member 26a, clamped between the clamping plate 27 and the support plate 26, and which provides the support surface while the inlet pipes 22 and connecting stud 24 extend through an aperture 26b provided through the bench member 26a.

The valve mechanism 11 is in the form of a cartridge assembly 32 (see also FIG. 9) adapted to be slipped into the interior of the tap body and against the mounting body 19, and is comprised by a cylindrical valve housing 33 having a closed lower wall 34 through which a pair of apertures 35 are provided (only one of which is visible in FIG. 2, but both of which are visible in the cut-away view of the housing 33 in FIG. 9). The apertures 35 align with the hot and cold water inlet passages 23 through the mounting body 19. The apertures 35 receive cylindrical sealing washers 36 as shown in FIGS. 2 and 3, the ends of which washers, at the mounting body 19, seal against that body around the passages 23, and the ends of which, within the valve housing, seal against a fixed ceramic disc 37 of a ceramic disc assembly 37, 38, the upper disc 38 of which is rotatable against the fixed disc 37 and also transversely slidable with respect thereto. The other ends of the sealing washers 36 bear against the fixed ceramic disc 37 in circular cavities 37a (see FIGS. 2 and 3) surrounding arcuate slot-shaped transfer passages 39 through the fixed disc and more clearly visible in FIGS. 5 to 9. The transfer passages 39 in turn communicate with a centrally disposed aperture 40 in the movable disc 38 which in turn opens radially outwardly of the disc to form a passage 40a the effect of which is to result in a movable disc having a substantially "horse-shoe" shape. A thin bridging portion (not shown) may be provided between opposed portions of the disc on either side of the passage 40a to increase the rigidity and therefor the strength of the disc, but insofar as the bridging portion is thinner than the thickness of the disc a radial passage 40a will still remain through which water can flow. The passage 40a communicates with outlet slots 33a in the wall of the valve housing 33, whereby at appropriate relative positions of the movable disc 38 relative to the fixed disc 37, hot and cold water at varying mixed ratios and volumes of mixture will pass through the ceramic disc assembly 37, 38, out of the valve housing 33 via undercuts at the bottoms of the slots 33a and extending into the lower wall 34 of the valve housing 33, and thereafter into the tap body 10 for supply to the tap outlet 16. The fixed disc 37 is located relative to the lower wall 34 of the housing 33 by virtue of blind holes 41 in the underface of the disc and in which are received locating studs 42 upstanding from the inside of the wall 34 of the housing 33 and such that when correctly positioned and located the transfer passages 39 will be aligned with the apertures 35. The housing 33 is in turn located relative to the mounting body 19 by virtue of a locating stud 43 on the outside of its end wall 34 and received within a blind hole 44 in the mounting body 19, and such that when located the apertures 35 will be aligned with the passages 23.

Figure 5:
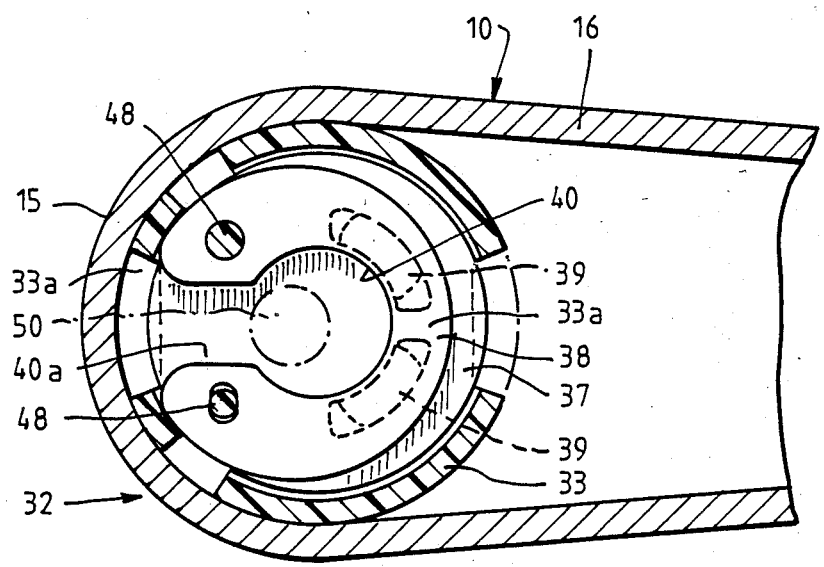
FIG. 5 is a transverse cross-sectional view taken along line 5—5 of FIG. 2 and showing one operating position of the valve mechanism within the tap.
Figure 6:
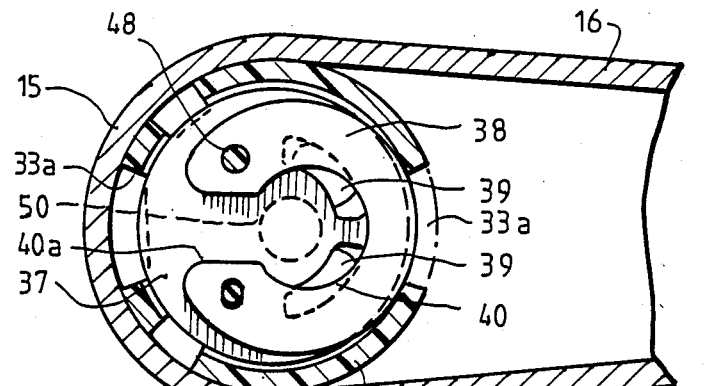
FIG. 6 is a view similar to that of FIG. 5 and showing another position of the valve mechanism.
Figure 7:
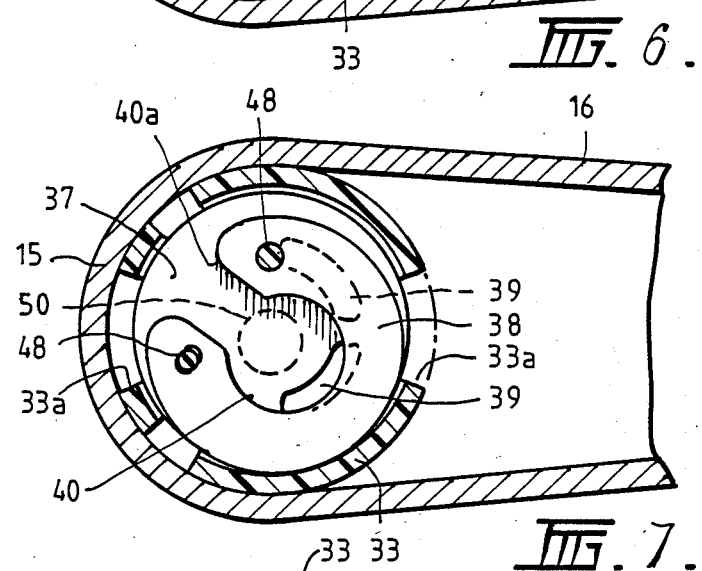
FIG. 7 is a view also similar to that of FIG. 5 and showing a further operating position of the valve mechanism.
Figure 8:
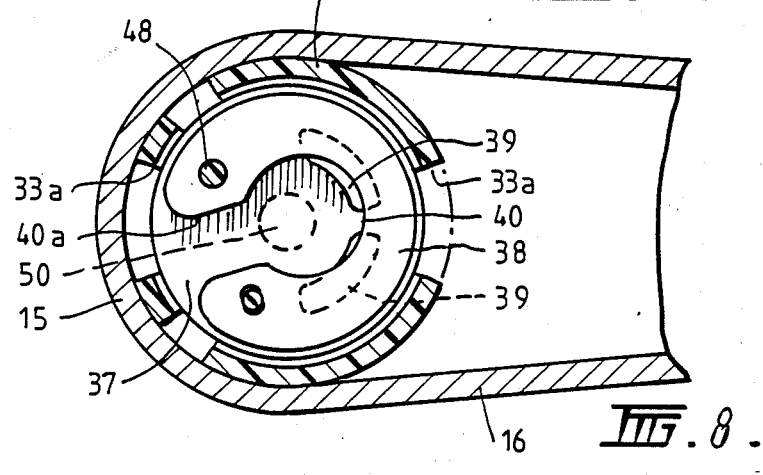
FIG. 8 is a view also similar to that of FIG. 5 of the drawings and showing a still further operating position of the valve mechanism.

Referring to FIGS. 5 to 8 of the drawings, the central aperture 40 of the movable ceramic disc in opening radially outwardly through the disc, and forming the substantially "horse-shoe" shaped disc, is such that, when slid transversely of the fixed disc from a closed position illustrated in FIG. 5, its aperture 40 is progressively brought into alignment with both the transfer passages 39 in the fixed disc as illustrated in FIG. 6 the and the volumes of hot and cold water passing through the ceramic disc assembly will therefore progressively increase. When the movable disc is rotated in one direction against the fixed disc progressively more of the passage 39 for hot water is exposed and progressively less of the passage 39 for the cold water is exposed. As shown in FIG. 7, movable disc 38 can rotate to a position where nearly all of the passage for hot water is open and the passage for cold water is totally closed. When rotated in the opposite direction, the ratio of the volumes of hot and cold fluid alters to lessen the amount of hot water and increase the amount of cold water as shown in FIG. 8. It will be appreciated that rotational and transverse movements can be carried out together to provide a full range of the ratios of hot and cold fluid being mixed and range of the volumes of the mixture passing through the ceramic disc assembly.

The cartridge assembly 32 also includes part of the valve operating mechanism 12, that is, the mechanism which applies transverse and rotatable movements to the movable disc 38 against and relative to the fixed disc 37, and which consists of a transmission member 45 for transmitting rotational movement of a handle 14a of the cap and handle assembly 14, and also tilting movements of the handle 14a, to rotational movement and transverse sliding movement of the movable discs respectively. The transmission member 45 consists of a circular plate 46 with a series of circumferentially extending flanges 47, the edges of which confront the face of the movable ceramic disc, while a connecting pin 48 carried by the circular plate 46 engages within a blind hole 49 in the movable ceramic disc and radially spaced from the central axis of the assembly, whereby rotation of the plate about the axis causes rotation of the movable ceramic disc and transverse movement at right angles to the axis causes transverse sliding movement of the movable ceramic disc. The plate 46 carries a centrally disposed upstanding hollow pillar 50 and a spherical ball member 51 is carried by the stem by virtue of a ball stem 51a received within the hollow pillar 50 as shown in FIG. 2. In practice the ball member 51 may be formed from metal and the plate 46 of plastics material to act as an insulator against heat being conducted from fluid passing through the ceramic disc assembly to the ball and onto what may be an operating mechanism and handle formed from metal and which may therefore become uncomfortable to touch if allowed to overheat when controlling relatively high water temperatures.

The cartridge assembly 32 is completed by an annular closure member 52 press-fitted within the upper end of the valve housing 33. The underface of the closure member 52 contains a plurality of annular grooves 53 each containing sealing "O" rings 54 sealing against the upper face of the transmission member 45 while a circumferentially extending groove 55 around the exterior of the closure member 52 carries an "O" ring 56 which seals against the inside wall of the valve housing 33. Radially extending locating lugs 57 engage appropriately shaped slots 57a in the top edge of the housing 33 to retain the closure member against rotational movement within the housing with the lug 57 and associated slot 57a on one side of the assembly being different from those on the other side of the assembly to ensure that the closure member 52 can only be inserted at the correct orientation so as not to interfere with the operation of the valve operating mechanism 12.

The valve operating mechanism 12 is completed by an elongate lever 58 mounted through a lever support housing 59 of generally cylindrical configuration and in which it is supported to tilt about a pivot pin 60. The lower end of the lever 58 has a socket 61 within which the ball member 51 is received, while the ball member carries diametrically opposed radially outwardly extending lugs 62 which are engaged within corresponding slots 63 in the wall of the socket 61 to provide a pivot axis about which the lever 58 and the ball 51 pivot with respect to each other. It will be appreciated that, as the lever 58 is rotated, together with its lever support housing 59, about the longitudinal axis of the tap, rotation will be transmitted through the ball and socket arrangement to the transmission member 45 and thus to the movable ceramic disc 38, while tilting of the lever 58 about the pivot pin 60 within the lever support housing 59 pushes the ball and socket arrangement transversely of the axis of the assembly and, via the transmission member 45, transmits sliding transverse movement to the movable disc. The rotation of the lever in one direction for a progressively greater supply of hot water and lesser supply of cold water, and in the other direction for progressively greater supply of cold water and a lesser supply of hot water, is limited by means of a pair of diametrically opposed lugs 59a carried by the bottom of the lever support housing 59 and adjacent the circumference thereof which, upon rotation of the housing through angles approaching 90° on either side of a midpoint, contact and are restricted against further movement, and therefor rotation of the housing and lever, by a pair of diametrically opposed abutments 52a within the circumference of a circular recess 52b in the top of the closure member 52.

The upper end of the housing 15 of the tap body is closed by a nut 64 externally threaded at 65 to cooperate with an internal thread within the upper end of the housing 15, and is undercut at 66 to provide a ledge 67 which engages a flange around the lower end of the lever support housing 59 to clamp it in position against the closure member 52 for the cartridge assembly 32 with the nut being hollow to surround the housing 59. The nut 64 is completed by an upstanding cylindrical wall section 64a, the external circumference of which is of an hexagonal configuration to be engaged by a wrench or other tool for the purposes of tightening the nut and for locating part of an upper and lower temperature limiting mechanism to be later described. A dress ring 72 for decorative purposes (see also FIG. 1) may also be screw fitted around the external thread of the nut 64 to bear against the upper edge of the tap housing.

With reference to both FIGS. 2, 3, 4 and 9 of the drawings, the mechanism for limiting rotation of the operating mechanism in one direction, usually in the direction of progressively greater supply of hot water, and which forms part of the limiting mechanism 13 of the tap assembly, comprises a fixed ring 68 which surrounds the cylindrical wall section 64a of the nut 64 and is serrated around its internal surface to provide notches which engage the corners of the external hexagonal configuration of the cylindrical wall section 64a. A pair of lugs 69 are formed on diametrically opposed sides of the ring 68 to be upstanding therefrom and thus, when the ring is in position, the lugs 69 are at fixed positions and non-rotatable relative to the nut 64a, and therefore the tap body, but can be adjustable relative thereto by disengaging the ring from the corners of the hexagon and repositioning at alternative positions on the hexagon.

A movable ring in the form of a cylindrical member 70 is provided, surrounding the fixed ring 68 and having a series of equally spaced clips 70a of resiliently flexible material carried thereby to extend radially inwardly, and the downwardly within the, the nut 64 and having enlarged ends 70b to engage with a circumferentially extending notch 71 around the inside of the section 64a of the nut 64. With reference to FIGS. 2 and 3, the external circumference of the member 70 is threaded at 70c and a cylindrical cap 73, forming a housing for the top of the tap assembly and being internally threaded at 73a for threaded attachment to the member 70, is screwed into position to leave a slight gap between the lower edge of the cap 73 and the dress ring 72. The cap 73 has an access opening 74 through its cylindrical wall to receive the handle 14a which extends from a screwed connection 76, incorporating a washer 76a and a lock washer 76b, at the top of the lever 58 to a position overlying, and movable to either side of and tiltable with respect to, the outlet 16 from the tap body. Rotational movement of the handle is transmitted, via the operating mechanism 12 to the movable ceramic disc, while upward and downward tiltable movement of the handle, via the operating mechanism 12, causes transverse sliding movement of the movable ceramic disc. During rotational movement, the handle 14a, the cap 73 and the member 70 rotate in unison in one direction until such time as bridge portions 70d on the underside of two of the diametrically opposed clips 70a move to a position abutting the respective lugs 69 on the fixed ring 68, and the assembly can rotate no further in that direction. The position of the fixed ring 68, and therefor the position of its lugs 69 relative to the clips 70a with the bridge portions 70d, can be adjusted by disengaging the ring 68 and repositioning it about the nut 64, and may be such that, rotation is restricted in one direction short of the fully rotatable position in that direction set by the lug and abutment arrangements 59a and 52a between the lever support housing 59 and the closure member 52, to prevent full volume of hot or cold water passing through the tap, and if set to prevent full volume of hot water, the limiting mechanism provides an anti-scalding facility which can be set during installation if required.

The lever support housing 59 also incorporates means for limiting the maximum volume of flow of mixed fluid through the tap mechanism by limiting the degree of tilting of the lever 58 by the handle 14a in the direction of increasing fluid flow, by providing an abutment 77 on the lever support housing 59 and in the path of the tilting movement of the lever in the direction of increasing flow, whereby by contacting the abutment 77 further tilting, and therefore further increase in fluid flow, will be prevented. In order to allow adjustment of the degree of tilting, and therefore the upper limit of fluid flow, a set screw 78 is provided through the lever and by adjustment of the screw outwardly of the lever toward the abutment 77 the degree of tilting can be further limited depending on the amount of outward adjustment of the set screw 78.

In order to prevent the ingress of water, and other possible contaminants, into the cap 73 through the opening 74, a portion 75 of the handle 14a which extends through the opening during tilting thereof is curved such that the outer and inner curvatures thereof each correspond with a radius of curvature about the pivot axis of the pivot pin 60 for the lever 58, whereby, having regard to that shape and the positioning of the pivot axis, the sizes of the handle and the opening, the handle will at all times substantially close the opening. In addition, in order to further limit access for liquids and other contaminants between the handle 14a and the opening 74, an insert 79 is engaged around the periphery of the opening and has a lower flap 79a curving upwardly of the opening, and inwardly of the cap, with curvature substantially corresponding to a radius of curvature about the pivot axis of the pivot pin 60 for the lever, and positioned adjacent the inner radius of the curved portion 75a of the handle thus reducing any gap to a minimum in the uppermost tilted position of the handle 14a.

The cap 73 may be completed by a detachable cover 73a, being in the form of a disc clipped within an opening through an upper wall 73b of the cap 73, to allow access to the screwed connection between the handle 75 and the lever 58 when dismantling the tap assembly for adjustment and/or service. The outer surface of the cover 73a may be suitably decorated as shown in FIG. 1 to provide an indication of direction of rotation of the cap and handle combination toward progressively hotter and colder mixture of fluids, and also the direction of tilting of the handle to achieve progressively greater or lesser volumes of flow of the mixtures.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A single handle mixing tap having a longitudial axis, said tap comprising:

a tap body;

a rotatable and pivotable handle; and a valve mechanism in the tap body, said valve mechanism comprising;

a pair of discs each having at least one aperture, a movable one of the pair of discs being rotatable and transversely movable relative to a fixed one of the pair of discs whereby fluids to be mixed from two separate inlets to the tap in communication with the apertures can be mixed when said apertures are at least partially aligned, each of said at least one aperture being partially to substantially aligned to thereby very a ratio of volumes of each of the fluids as well as a combined volume of the fluids, and a ball joint arrangement coupled to the handle through a lever, said lever being rotatable and pivotable with rotation and pivoting of said handle, said ball joint arrangement comprises a ball received within a complementary socket in the lever, said ball having at least one pin engaging a slot within said socket, said at least one pin extending transversely of the longitudinal axis of the tap, rotation and pivoting of the handle being transferred to the movable disc through said lever, said handle and lever being rotatable about an axis of said ball joint to transversely move said movable disc, the axis for rotation and axis for pivoting being positioned such that substantially all forces applied by the handle to the ball joint are radially of said joint rather than along the longitudinal axis of the tap.

2. The tap as claimed in claim 1, wherein said movable disc when rotated relative to the fixed disc by rotation of said handle and lever varies the ratio of the volumes of fluids to be mixed, and when moved transversely relative to the fixed disc by pivoting of said handle and lever varies the combined volume of the fluids to be discharged from an outlet of the tap body.

3. The tap as claimed in claim 1, further comprising means for limiting rotation of said movable disc in either direction.

4. The tap as claimed in claim 3, wherein said means for limiting the rotation of said movable disc is incorporated between an operating mechanism between said handle and said disc, and a member fixed with respect to said tap body.

5. The tap as claimed in claim 1, further comprising means for limiting total volume of fluid passing through said tap.

6. the tap as claimed in claim 5, wherein the means for limiting the total volume of fluid passing through said tap comprises an upstanding tilt abutment in the path of movement during pivoting of said lever to limit the degree of pivoting of said lever and the associated handle.

7. The tap as claimed in claim 5, further comprising means for adjusting the limit of total volume of fluid passing through said tap.

8. The tap as claimed in claim 6, further comprising means for adjusting the limit of total volume of fluid passing through said tap.

9. The tap as claimed in claim 8, wherein said means for adjusting is a set screw carried by said lever, said set screw having a head which is adapted to contact said tilt abutment, whereby adjustment of the set screw varies the distance said lever can tilt before said set screw contacts said tilt abutment.

10. The tap as claimed in claim 1, further comprising means for adjusting upper and lower limits of the temperature of the mixture of fluids.

11. The tap as claimed in claim 10, wherein said adjustable control means comprises at least one pair of first abutment means rotatable with said handle, and at least one pair of second abutment means fixed with respect to said tap body, whereby movement of said handle in one direction with respect to said housing brings one of said first abutment means into contact with one of said second abutment means to limit the movement of said movable disc in that direction to thereby control the volume of hot fluid to be mixed, and movement of said handle in the opposite direction relative to said tap body brings the other of said first abutment means into contact with the other of said second abutment means to limit the movement of said movable disc in that direction to thereby control the volume of cold fluid to be mixed, and wherein the position of at least one of said first and second abutment means is adjustable to vary the respective volumes of hot and cold fluids to be mixed.

12. The tap as claimed in claim 1, further comprising means for minimizing access by at least one of fluids and other contaminants to the interior of the tap.

13. The tap as claimed in claim 12, wherein said tap body is closed by a cap having an opening through which said handle extends, whereby the size and shaping of said handle and the size of said opening, together with the axis of pivoting of said handle relative to said cap, are such that a portion of said handle extending through said opening during all pivoted positions of said handle substantially closes said opening.

14. The tap as claimed in claim 1, wherein a pair of diametrically opposed pins are provided in said ball joint arrangement to engage diametrically opposed slots within said socket.

15. A single handle mixing tap comprising:
a tap body;
a rotatable and pivotable handle;
a valve mechanism in the tap body, said valve mechanism including a pair of discs each having at least one aperture, one of said pair of discs being movable relative to a fixed one of the pair of discs whereby fluids to be mixed from two separate inlets to the tap in communication with the apertures can be mixed when said apertures are at least partially aligned, said movable disc being operatively connected to said handle whereby rotation of the handle cause rotation of said movable disc; and
first and second pairs of abutment means for limiting rotation of said handle, said first pair of abutment means being rotatable with said handle and the second pair of abutment means being fixed with respect to the tap body whereby rotation of said handle in a first direction with respect to the tap body brings one of said first abutment means into contact with one of said second abutment means to limit movement of said movable disc in the first direction to thereby control a volume of hot fluid to be mixed, and rotation of said handle in a second direction with respect to the tap body brings another of said first abutment means into contact with another of said second abutment means to limit movement of said movable disc in the second direction to thereby control a volume of cold fluid to be mixed, said first and second directions being opposite directions, a position of a least one of said first means being adjustable to vary respective volumes of both the hot and cold fluids to be mixed.

* * * * *